United States Patent
Fogle et al.

(10) Patent No.: US 10,081,712 B2
(45) Date of Patent: Sep. 25, 2018

(54) POLYMERIZATION COUPLED COMPOUNDING PROCESS

(71) Applicant: Ascend Performance Materials Operations LLC, Houston, TX (US)

(72) Inventors: Raymond E. Fogle, Houston, TX (US); Troy D. Calvert, Houston, TX (US); Zachary J. Carben, Houston, TX (US); Steven C. Manning, Houston, TX (US); Chie H. Wang, Houston, TX (US); Paul A. Wheeler, Houston, TX (US); J. Marty Zabcik, Houston, TX (US)

(73) Assignee: Ascend Performance Materials Operations LLC, Houston, TX (US)

( * ) Notice: Subject to any disclaimer, the term of this patent is extended or adjusted under 35 U.S.C. 154(b) by 0 days.

(21) Appl. No.: 14/776,466

(22) PCT Filed: Mar. 13, 2014

(86) PCT No.: PCT/US2014/026353
§ 371 (c)(1),
(2) Date: Sep. 14, 2015

(87) PCT Pub. No.: WO2014/151735
PCT Pub. Date: Sep. 25, 2014

(65) Prior Publication Data
US 2016/0046766 A1    Feb. 18, 2016

Related U.S. Application Data

(60) Provisional application No. 61/798,641, filed on Mar. 15, 2013.

(51) Int. Cl.
| | | |
|---|---|---|
| *B29C 47/92* | (2006.01) | |
| *C08J 3/20* | (2006.01) | |
| *C08G 69/28* | (2006.01) | |
| *C08K 5/00* | (2006.01) | |
| *B29C 47/10* | (2006.01) | |
| *C08K 3/01* | (2018.01) | |
| *C08L 77/06* | (2006.01) | |
| *B29K 105/00* | (2006.01) | |
| *B29C 47/00* | (2006.01) | |
| *B29C 47/40* | (2006.01) | |
| *B29C 47/60* | (2006.01) | |
| *B29K 77/00* | (2006.01) | |
| *B29C 47/76* | (2006.01) | |

(52) U.S. Cl.
CPC .......... *C08J 3/201* (2013.01); *B29C 47/1063* (2013.01); *C08G 69/28* (2013.01); *C08K 3/01* (2018.01); *C08K 5/0008* (2013.01); *B29C 47/0004* (2013.01); *B29C 47/402* (2013.01); *B29C 47/6087* (2013.01); *B29C 47/767* (2013.01); *B29K 2077/00* (2013.01); *B29K 2105/0002* (2013.01); *B29K 2105/0094* (2013.01); *C08J 2377/00* (2013.01); *C08J 2377/06* (2013.01); *C08L 77/06* (2013.01)

(58) Field of Classification Search
None
See application file for complete search history.

(56) References Cited

U.S. PATENT DOCUMENTS

| | | |
|---|---|---|
| 2,273,188 A | 2/1942 | Graves |
| 2,361,717 A | 10/1944 | Taylor |
| 2,810,630 A | 10/1957 | Herele |
| 3,391,232 A | 7/1968 | Jackson |
| 3,523,331 A | 8/1970 | Weeks |
| 3,560,430 A | 2/1971 | Meyer et al. |
| 3,846,381 A | 11/1974 | Kwok |
| 4,065,532 A | 12/1977 | Wild et al. |
| 4,958,006 A | 9/1990 | Bernier et al. |
| 4,977,216 A * | 12/1990 | Elia .......... C08L 77/00 525/183 |
| 5,169,582 A | 12/1992 | Illing |
| 5,236,645 A | 8/1993 | Jones |
| 5,236,652 A | 8/1993 | Kidder |
| 5,376,702 A | 12/1994 | Stibal et al. |
| 5,403,910 A | 4/1995 | Kosinski et al. |
| 5,502,154 A | 3/1996 | Iwasyk |
| 5,665,854 A | 9/1997 | Kosinski et al. |
| 6,149,850 A | 11/2000 | Gannon |
| 6,258,503 B1 | 7/2001 | Nakamura et al. |
| 6,350,805 B1 | 2/2002 | Korbee et al. |
| 6,441,109 B1 | 8/2002 | Burlone et al. |
| 6,465,583 B1 | 10/2002 | Burlone et al. |
| 6,518,341 B1 | 2/2003 | Hurley et al. |

(Continued)

FOREIGN PATENT DOCUMENTS

| | | |
|---|---|---|
| CN | 1060811 A | 5/1992 |
| CN | 101842206 A | 9/2010 |

(Continued)

OTHER PUBLICATIONS

International Search Report and Written Opinion issued by the International Bureau of WIPO dated Jul. 11, 2014 in International Application No. PCT/US2014/026353.
AkzoNobel, Polymer Additives, 11 pages (2013).
Reiners, H.W., "Plastic Additives at BASF", 8 pages.
BASF Ultramid® A3Z and A3L, "New High and Medium Impact Modified Nylon 66 with 30%-50% Higher Flow", 3 pages.
BASF Ultramid® Grades in Extrusion, "The material of choice for demanding requirements in the packaging and extrusion field", 12 pages.
BASF Ultramid® (PA) Product Brochure, 68 pages (2013).
Clariant, "Polymer Additives for the Plastics Industry", Overview,16 pages (2010).

(Continued)

*Primary Examiner* — Robert T Butcher
(74) *Attorney, Agent, or Firm* — Morgan, Lewis & Bockius LLP

(57) ABSTRACT

Provided is a process for preparing an improved compounded product and a compounded product prepared by the described process.

16 Claims, 6 Drawing Sheets

(56) References Cited

U.S. PATENT DOCUMENTS

| | | | |
|---|---|---|---|
| 6,562,896 B2* | 5/2003 | Lysek | C08K 5/20 524/538 |
| 6,616,438 B2 | 9/2003 | Burlone et al. | |
| 7,070,404 B2 | 7/2006 | MacPhee et al. | |
| 7,132,498 B2* | 11/2006 | McCloskey | C08G 64/307 264/176.1 |
| 7,931,842 B2 | 4/2011 | Barakat et al. | |
| 8,034,269 B2 | 10/2011 | Schwemler et al. | |
| 8,262,925 B2 | 9/2012 | Fieback et al. | |
| 2005/0121817 A1 | 6/2005 | Konig et al. | |
| 2005/0272914 A1 | 12/2005 | McElvain et al. | |
| 2006/0118989 A1 | 6/2006 | Shinbach et al. | |
| 2006/0258816 A1 | 11/2006 | Endo | |
| 2008/0009576 A1 | 1/2008 | Alexander et al. | |
| 2008/0287643 A1 | 11/2008 | Strauch et al. | |
| 2009/0069499 A1 | 3/2009 | Sarukawa | |
| 2009/0121372 A1 | 5/2009 | Campbell et al. | |
| 2009/0258226 A1 | 10/2009 | Schwinn et al. | |
| 2011/0015328 A1 | 1/2011 | Orihashi | |
| 2011/0144300 A1 | 6/2011 | Desbois et al. | |
| 2015/0158977 A1 | 6/2015 | Ishimaru et al. | |

FOREIGN PATENT DOCUMENTS

| | | |
|---|---|---|
| EP | 0 356 978 B1 | 5/1999 |
| GB | 998063 | 7/1965 |
| JP | H07-242817 A | 9/1995 |
| JP | 2009-114429 A | 5/2009 |
| JP | 2011-530639 A | 12/2011 |
| WO | 99/29767 | 6/1999 |
| WO | 2013/190629 A1 | 12/2013 |

OTHER PUBLICATIONS

Coperion, Plants for the Plastics Industry. How we respond to individual application challenges with tailored solutions, 18 pages.
Dover Chemical Corporation, "High Performance Additives", 20 pages (2001).
DuPont™ Zytel® HTN, 20 pages (2001).
Eastman, Tenite Cellulosic Plastics, "Extrusion of Tubing and Profiles", 16 pages (1997).
Evonik Industries, Additives for Masterbatches and Compounds, 16 pages (2008).
Jetro Supporting Industry Program, "Mold Plastic Set Textbook for Website", 98 pages (2006).
KraussMaffei Berstorff, Press Release, "Twin-screw extruders from KraussMaffei Berstorff reduce material costs and increase flexibility", 3 pages (2010.
KraussMaffei Berstorff, "ZE twin-screw extruders", 30 pages.
Lanxess Energizing Chemistry, "A processing guide for Injection Molding", 65 pages (2005).
Lubrizol, "Estane Thermoplastic Polyurethanes", Extrusion Guide, 8 pages (2007).
Nanocor®, "Lit. N-662 (Oct. 2004) Guidelines & Setup Parameters for Nylon 6,6 Nanocomposites", 2 pages (2004).
Nexeo Solutions, Chemicals Plastics Additives, 2 pages (2012).
NYTEF Plastics, Fabrication Guidelines, 18 pages (2002).
Extrusion of Thermoplastics, http://www.pitfallsinmolding.com/extrusion1.html 2/; 15 pages.
Plastic Behavior in the Extruder, PDL Handbook Series, Extrusion: the Definitive Processing Guide and Handbook, William Andrew publishing, 18 pages (2005).
Plastic troubleshooter, "Venting the Mold", http://www.plastictroubleshooter.com/ThePlastictroubleshooter/moldVenting.htm; 3 pages.
Plastics Additives, "Featuring Antioxidants and Light Stabilizers", 6 pages (2010).
Plastics Technology, "Engineering Thermoplastics", 4 pages (2000).
Plastics Technology, "In Twin-Screw Compounding, Distinguish between 'Disease' and 'Illness'", 3 pages (2010).
Shear Rates, Pressure Drops, and Other Extruder Calculations, 3 pages (2005).
Sterling, SIHI Pumps, LPH Series—Liquid Ring Vacuum Pumps, 11 pages.
Theoretical and Experimental Principles, 29 pages.
Unruhe, K., Plastics Additives, "Plastics Additives Unit Plan", 78 pages (2012) ☐.
Van Beusichem, B., "Introduction to Polymer Additives and Stabilization", 1 page. (2005).
Vasanthan, N., "Polyamide fiber formation: structure, properties and characterization", pp. 232-256 (2009).
Vydyne Processing guidelines, "Typical Molding Conditions for Vydyne® Extrusion Grade Nylon", 1 page.
Wellman Engineering Resins, Design Guide, 55 pages (2009).
Wintek Corp., "Extruder vacuum systems", 1 page.
Search Report issued in a corresponding Singapore Patent Application No. 11201507449W dated May 6, 2016.
Written Opinion issued in a corresponding Singapore Patent Application No. 11201507449W dated Aug. 4, 2016.
Extended European Search Report issued in a corresponding European Patent Application No. 14769229.7 dated Nov. 23, 2016.
First Office Action issued in a corresponding Chinese Patent Application No. 201480022596.3 dated Sep. 29, 2016.
Office Action issued in corresponding Japanese Patent Application No. 2016-502112 dated Dec. 19, 2017.
Second Office Action issued in corresponding Chinese Patent Application No. 201480022596.3 dated Jun. 20, 2017.
Third Office Action issued in corresponding Chinese Patent Application No. 201480022596.3 dated Jan. 11, 2018.
First Office Action issued in corresponding Saudi Arabian Patent Application No. 515361172 dated Oct. 9, 2017.
Written Opinion issued in corresponding Singapore Patent Application No. 11201507449W dated Mar. 20, 2018.

* cited by examiner

POLYMERIZATION COUPLED COMPOUNDING PROCESS

BACKGROUND OF THE INVENTION

Polymer compounding is a well-known process for preparing plastic formulations by the mixing and/or blending of polymers, such as polyamides or polyesters, with, for example, additives, fillers, reinforcing agents and modifiers while the polymer is in a melted or semi-melted state. See, e.g., U.S. Pat. Nos. 6,149,850; and 5,236,652. Compounding typically takes place in an extruder. The step(s) of mixing and/or blending with, for example, additives, fillers, reinforcing agents and modifiers generally occurs prior to the shaping step, i.e., prior to extrusion, injection molding, etc. The additives, fillers, reinforcing agents and modifiers impart preferred properties to the host polymer to which they are added.

It is desirable that the final plastic product contains as low as possible amount of volatile components such as residual monomers, organic solvents and water. The presence of significant levels of water promotes depolymerization (hydrolysis) and reduces the molecular weight and melt viscosity of the polymer to the point where bubbles form in the extrudate. Degassing of the polymer during the compounding process is the typical means for achieving a low volatile component content. To achieve effective degassing of the volatile components during the compounding process, high vacuum and high temperatures are required, but at high temperatures, degradation of the polymer significantly increases. If, however, temperatures in the extruder are maintained at levels to minimize degradation of the polymer, effective melting and blending of the compound components is negatively impacted, which has a deleterious effect on the quality of the final product. See, e.g., U.S. Pat. No. 8,034,269. These problems are particularly prevalent at high throughput rates, where the short exposure time of the polymer to the compounding process is dictated by cost efficiency. Thus, at a high throughput rate, increasingly effective degassing of the volatile components occurs at the expense of an increase in the rate of degradation of the polymer. An economic analysis is required to determine the acceptable balance between these two competing outcomes. It is known, for example, that polyamide resins useful in molding and extrusion applications experience undesirable mold buildup over time, thereby reducing machine uptime and capacity utilization. See, e.g., *Plastics Technology* (2000) (http://www.ptonline.com/articles/engineering-thermoplastics); page 13 of the *DuPont™ ZYTEL® HTN Molding Guide* (2001) (http://www.dupont.com/content/dam/assets/products-and-services/plastics-polymers-resins/Documents/H85940.pdf which acknowledge the problems associated with vent plugging. U.S. Pat. No. 6,518,341 refers to vent accumulation, how it relates to burning in the mold and introduces a "shots before burn" term which relates to mold deposits or plate-out and how the productivity of injection molding is adversely impacted by this mold depositing.

Polyamide resins are routinely compounded by use of an extruder for mixing, for example, additives, fillers, reinforcing agents and modifiers with polyamides such as nylon, including nylon 6, nylon 4/6, nylon 6/6, nylon 6/10, nylon 6/12, nylon 11 and nylon 12, where the polyamide is in a solid (e.g., pelletized or flake or chip) form. Typically, the compounding process comprises introducing nylon feedstock in solid form into the first half of an extruder to achieve melting of the feedstock. After melting has occurred, one or more additives, fillers, reinforcing agents and modifiers are introduced and mixed into the nylon melt. In an extruder containing multiple barrel zones, a vacuum is typically applied to remove undesired volatiles and moisture from the polyamide and the additive, filler, reinforcing agent and/or modifier stream. If not removed, these undesired components foul the customer's mold over time, thereby reducing machine uptime and capacity utilization. See, e.g., A. Dreiblatt, Plastics Technology (2010) (http://www.ptonline.com/columns/in-twin-screw-compounding-distinguish-between-disease-and-illness). U.S. Pat. No. 6,518,341 also describes the problems resulting from the presence of deposits in injection molding operations.

Accordingly, longer exposure time of the polyamide melt to vacuum conditions and to a higher vacuum improves the product quality by decreasing the level of water and any residual impurities such as low molecular weight oligomer content such as nylon oligomer, monomers, stearates and wax components. The removal of impurities is limited by the number of extruder barrel sections that can be used for vacuum exposure, i.e., those barrels not already utilized for nylon melting and glass or additive feed points. The residual content of volatile components is typically determined by means of gas chromatography, with quantitative evaluation carried out using an internal standard.

It is known that variability in the feedstock significantly contributes to poor process stability and lack of quality control for the compounded product. See, e.g., *Extrusion: The Definitive Processing Guide and Handbook* (2005) by Harold F. Giles Jr. et al. Particularly when the feedstock is stored in a solid form, this undesired variability originates from multiple sources (e.g., differences in moisture levels between samples and the age of the feedstock). As a result, drying of the solid feedstock is frequently required prior to extrusion to achieve a controlled and consistent moisture content necessary to prevent significant reduction of relative viscosity (RV) due to hydrolysis. See, e.g., *Extrusion: The Definitive Processing Guide and Handbook* (2005) by Harold F. Giles Jr. et al.

Poor warehouse management further contributes to the variability observed in the precursor compounding operation when the feedstock is in solid form as the feedstock is also susceptible to air oxidation over time.

Thus, there remains a recognized need for a compounded polymer, such as a compounded polyamide, such as compounded nylon66, that exhibits superior stability with improved performance with low variability of impurities, and the process for manufacturing such a product at the lowest possible cost. The compounded polymer prepared by the in-line process described herein shows improved molding performance with significantly lower plate out and longer mold life between cleanings compared to conventionally prepared compounded polymers where the feedstock is introduced to the polymer compounding equipment in solid form. The viscosity and quality control ranges for such a product are also less variable than that resulting from conventional pellet fed compounding. This corresponding improvement in quality directly translates into a superior product for the customer in terms of improved performance and lower cost compared to products prepared from a conventional compounding operations using feedstock in solid form.

SUMMARY OF THE INVENTION

An aspect of the invention is a process for preparing a compounded polyamide, comprising introducing a molten or substantially molten polyamide feedstock directly to one or more (such as 2, 3, 4, 5, etc.) polymer compounding devices, where the polyamide feedstock is prepared by a polymerization process, wherein the polymerization process is a continuous polymerization process or a batch polymerization process.

In an aspect of the invention, the polyamide is selected from the group consisting of nylon 6, nylon 4/6, nylon 6/6, nylon 6/10, nylon 6/12, nylon 11, nylon 12, nylon MXD6, copolymer nylon (a copolymer of caprolactam with hexamethylenediamine adipate), nylon block copolymers, and copolymers comprising these nylons as main components. The methods of preparation of polyamides such as nylon 6/6 are well known. See, e.g., U.S. Pat. Nos. 6,197,855; 4,981,906; 4,320,213; 4,346,200; 4,713,415; 4,031,164; 2,071,250; 2,071,251; 2,130,523; 2,130,948; 2,241,322; 2,312,966; 2,512,606; and 3,393,210.

In an aspect of the invention, the nylon is nylon 6/6 (also referred to herein as nylon 66 or nylon66 or polyamide 66 or PA 66 or PA66).

In an aspect of the invention the compounded polyamide is a homopolymer.

In an aspect of the invention the compounded polyamide is a copolymer.

In an aspect of the invention, the molten polyamide feedstock is at a temperature of about 200° C. to 400° C. entering the polymer compounding device, such as 250° C. to 375° C., such as 275° C. to 300° C.

In an aspect of the invention, the polymer compounding device is an extruder.

In an aspect of the invention, the extruder is independently a twin-screw extruder or a single-screw extruder.

In an aspect of the invention, the twin-screw extruder is co-rotating or counter-rotating.

In an aspect of the invention, the extruder independently contains at least 2 vent ports.

In an aspect of the invention, the extruder independently contains at least 3 vent ports, such as 4, 5, 6, 7, 8, 9 or 10 vent ports.

In an aspect of the invention, the extruder vent ports are at atmospheric pressure (i.e., not subjected to vacuum conditions) or, alternatively, are subjected to vacuum conditions. In the case of multiple vent ports, a portion of the vent ports may be at atmospheric pressure and a portion of the vent ports may be subjected to vacuum conditions.

In an aspect of the invention, the twin-screw extruder has a length to diameter ratio of the screw shaft in the range of 24:1 to 56:1.

In an aspect of the invention, the twin-screw extruder has a length to diameter ratio of the screw shaft in the range of 36:1 to 48:1.

In an aspect of the invention, one or more additives, fillers, reinforcing agents or modifiers are introduced into the compounding extruder.

In an aspect of the invention, fiberglass is compounded with nylon66 in a range of about 5% to about 60% by weight such as about 10% to 55%, such as 15% to 50%, such as 20% to 50%, such as 25% to 50%, such as 35% to 45%.

In an aspect of the invention, the vent ports are used for removal of moisture or impurities from the compounded polyamide.

In an aspect of the invention, only a portion (such as, for example, greater than 0% up to about 99%, such as between about 5% up to about 95%, such as between about 15% up to about 85%) of the molten or substantially molten polyamide feedstock is sent directly to the one or more polymer compounding devices.

In an aspect of the invention, the polymerization process is located less than 500 feet from the polymer compounding device.

In an aspect of the invention, the compounded polyamide has a relative viscosity (RV) range between about 35 and about 120, such as between about 40 and about 100, such as between about 40 and about 80, such as between about 45 and about 60.

An aspect of the invention is a polyamide prepared by a process as described herein.

An aspect of the invention is a compounded polyamide having a plate out value of less than about 3 mg/1,000 shots, such as less than about 2.5 mg/1,000 shots, such as less than about 1.5 mg/1,000 shots, such as less than about 1.0 mg/1,000 shots, such as less than about 0.5 mg/1,000 shots, such as less than about 0.3 mg/1,000 shots, with the lowest value being 0 or a value greater than zero such as, for example, 0.01 mg/1,000 shots or 0.05 mg/1,000 shots or 0.1 mg/1,000 shots.

An aspect of the invention is a compounded polyamide exhibiting greater than about 200 shots before detection of burn material in the injection mold, such as greater than about 300 shots, such as greater than about 400 shots, such as greater than about 500 shots, such as greater than about 600 shots, such as greater than about 700 shots, such as greater than about 800 shots, and including ranges such as between about 400 to about 800 shots before detection of burn material, such as between about 500 to about 800 shots such as between about 600 to about 800 shots.

In an aspect of the invention, the compounded polyamide has a relative viscosity (RV) range between samples of less than about 3 units, such as less than about 2 units, such as less than about 1 unit, such as less than about 0.8 units, such as less than about 0.5 units.

BRIEF DESCRIPTION OF THE DRAWINGS

The figures represent exemplary embodiments and are not intended to limit the scope of the present invention as otherwise described herein.

DETAILED DESCRIPTION

Definitions

Figure 1:
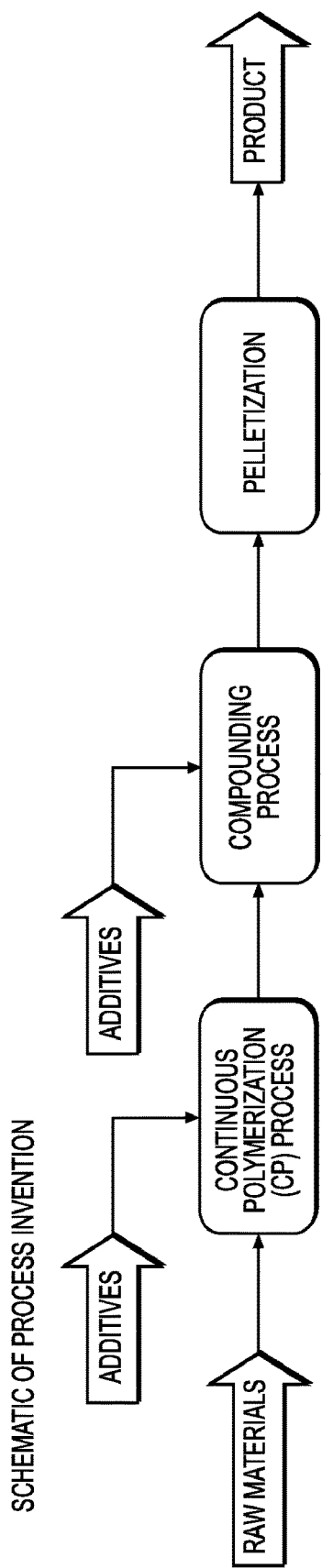
FIG. 1 represents a schematic of a molten stream fed compounding operation suitable for use in the present invention. Raw materials, comprising hexamethylene diamine (HMD), adipic acid, water, catalyst, modifiers, stabilizers and additives, are fed to a conventional continuous polymerization process where a nylon polymer comprising PA66 is produced at RV levels between about 35 to about 200. This molten polymer is not allowed to freeze for the purpose of pellet formation or for any other solid method of production—i.e., no significant solidification of the molten polymer is allowed to occur between the continuous polymerization and the subsequent compounding processes. Instead, the molten stream is fed directly to compounding equipment in proximity where any of many types of additives, minerals, reinforcers, modifiers, fillers, etc., are mixed into the polymer to form a new compounded product. This new compounded product is processed through a pelletization system, stored, conveyed and packaged in any combination of conventionally employed containers in the industry.
Figure 2:
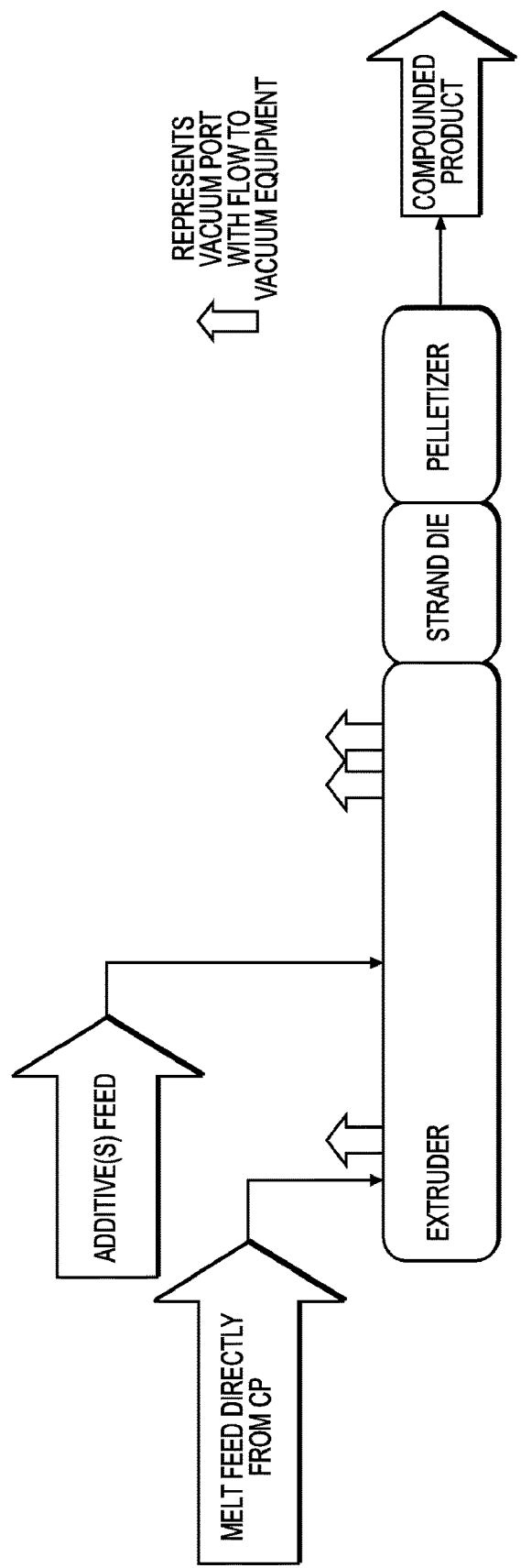
FIG. 2 represents a schematic of a molten stream fed compounding operation using a twin screw extruder as the compounding device. Molten polymer from the continuous polymerization process flows directly in to the compounding twin screw extruder. Multiple vent ports are provided for progressing the incremental decrease of absolute pressure in the venting zones. Combi-barrels are used to introduce solid type additives, modifiers, fillers, reinforcers, etc., and injection ports are used to introduce those same components most appropriately introduced in liquid form. Following the compounding unit, the molten product stream is typically fed to a stranding and pelletizing unit with drying and moisture control capabilities known to those skilled in the art. Following the pelletization, the compounded product is conveyed, stored, and packaged in any standard packaging container available for compounded plastics products.
Figure 3:
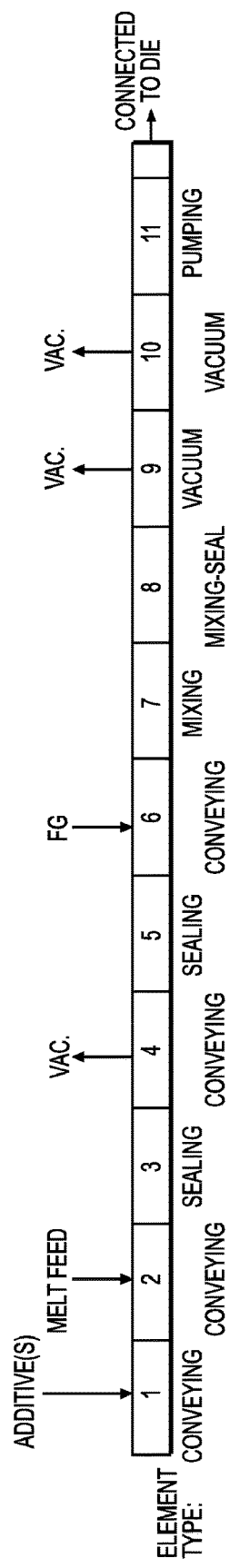
FIG. 3 represents a schematic of a multi-barrel extruder suitable for use in the present invention as the compounding process. While any of several barrel and screw designs are possible for producing the various compounded products capable of being produced by the described system, the depicted combination has been observed to be highly effective for producing superior plate-out results with 50% glass-filled nylon PA66 with a target RV of 48 and a moisture content of 0.15% by weight.

Unless defined otherwise, all technical and scientific terms described herein have the same meaning as commonly understood by one of ordinary skill in the art to which this disclosure belongs.

As described herein, "melt" or "melted" refers to a transition from a solid phase to a liquid phase.

As described herein, "molten" refers to a material that has never been present in a solid phase.

As described herein, "substantially melted" means at least 70% melted, such as at least 75% melted, such as at least 80% melted, such as at least 85% melted, such as at least 90% melted, such as at least 95% melted, such as at least 97% melted, such as at least 99% melted.

As described herein, "substantially molten" means at least 70% molten, such as at least 75% molten, such as at least 80% molten, such as at least 85% molten, such as at least 90% molten, such as at least 95% molten, such as at least 97% molten, such as at least 99% molten.

As described herein, "polymer compounding device" refers to a device in which polymer compounding occurs. Devolatilization may optionally occur in the polymer compounding device if the polymer compounding device contains a suitable means for devolatilizing the polymer before, during and/or after the compounding process.

As described herein, "relative viscosity" or "RV" refers to a comparison of the viscosity of a solution of polymer in formic acid with the viscosity of the formic acid itself and is measured using 90% formic acid and glass capillary Ubbelohde viscometers according to ASTM D789. For samples containing fiberglass or other fillers, the weight of sample to be dissolved is adjusted according to the amount of filler to provide the required 11.0 grams of neat resin per 100 ml formic acid. Solutions containing such fillers are filtered before loading into the viscometer.

As described herein, "dimensional stability" is a measure of the dimensional consistency from shot-to-shot in a molding process.

As described herein, "weight stability" is a measure of the mass consistency from shot-to-shot in a molding process.

As defined herein, "warpage" is a measure of the dimensional deviation of a molded part to that of the mold.

As defined herein, "scrap rate" is a measure of the amount of out-of-spec parts that are produced on a molding process.

The present invention provides a process for producing an improved compounded polymer such that the compounded polymer exhibits less variability in viscosity, and when used in molding or extrusion operations, results in less injection molding deposits ("plate-out"), thus producing better quality molded parts and extending the operational life of the mold (i.e., the machinery) between overhauls required to remove the deposits. In conventional compounding operations, the polymer (e.g., a polyamide) feedstock is supplied to an extruder in a solid form. In contrast, the present invention introduces a polyamide feedstock in molten form (e.g., from a continuous or batch polymerization process) directly into polymer compounding equipment in a process referred to herein as inline compounding ("ILC"). In an exemplary embodiment, the continuous or batch polymerization process is in proximity to the polymer compounding equipment (e.g., an extruder), such as within 1,000 feet, such as within the same building, such as within 500 feet, such as within 300 feet, such as within 200 feet, such as within 100 feet, such as within 50 feet, such as within 20 feet. By introducing a polyamide feed to polymer compounding equipment where the polyamide feed is already in molten form, additional extruder barrels, normally used for melting the resin, can alternatively be used for increasing vacuum exposure. This increased vacuum exposure in turn results in increased impurity removal and a cleaner product. An additional benefit resulting from applying vacuum in more zones of the polymer compounding equipment (e.g., an extruder) is that the final vacuum zone can operate at a lower pressure (i.e., at a decreased equipment cost) using common vacuum equipment, due to the significant removal of impurities that has already occurred in prior zones.

In addition, the continuous polymerization or batch polymerization molten feed stream to the polymer compounding equipment results in a compounded polymer with improved viscosity and/or moisture stability. In an exemplary embodiment, the polyamide feed to extrusion requires less than one hour (such as between 1 and 50 minutes, such as between 1 and 40 minutes, such as between 1 and 30 minutes, such as between 1 and 20 minutes, such as between 1 and 10 minutes) in melt transit to the extruder via a transfer pipe. This molten stream is low in melt history and heat cycles as it is not solidified (in contrast to when the polymer feed stock is present in a solid form) prior to use in the compounding operation. Having at least one less product handling system in place between the polymerization and compounding operations reduces the chance of contamination or foreign body inclusion. Yield improvement and labor cost reduction are also realized with the present invention.

Continuous polymerization processes such as those employed by the present invention are well known. See, e.g., U.S. Pat. Nos. 3,113,843; 3,947,424; 4,851,466; 5,674,974; and *Handbook of Fiber Chemistry* (2007) 3rd ed., CRC Press, pp. 35-77.

Batch (also referred to as "clave" or "autoclave") polymerization processes are also suitable for use in the present invention, e.g., as a molten feed directly introduced to a polymerization compounding device. Batch polymerization processes are well known. See, e.g., U.S. Pat. Nos. 4,851,466; 5,245,005; and 4,032,517.

Conventional injection molding, extrusion molding, blow molding, press molding, compression molding and gas assist molding techniques are generally suitable for molding of the compounded polyamides. See, e.g., U.S. Pat. Nos. 8,658,757; 4,707,513; 7,858,172; and 8,192,664.

The compounded polymer prepared by the ILC process shows improved molding performance with significantly lower plate out and longer mold life between cleanings compared to conventionally prepared compounded polymers where the feedstock is introduced to the polymer compounding equipment in solid form. The viscosity and quality control ranges for such a product are also less variable than that resulting from conventional pellet fed compounding. This corresponding improvement in quality directly translates into a superior product for the customer in terms of improved performance and lower cost compared to products prepared from a conventional compounding operations using feedstock in solid form.

Figure 4:
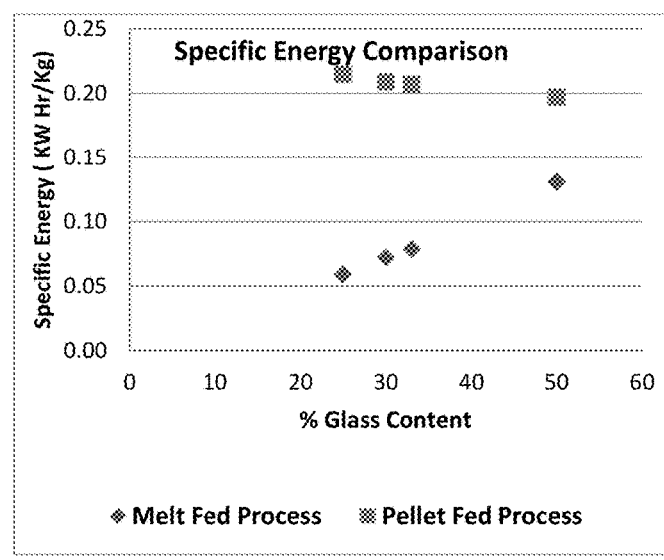
FIG. 4 shows the energy comparisons associated with using molten PA66 feedstock introduced to an extruder compared to conventional pelletized PA66 feedstock in the preparation of a fiberglass-compounded product.

Also, because the feedstock is conveyed in a molten state to the polymer compounding equipment, the polymer compounding equipment motor size can be reduced since the initial energy required to melt the feedstock is avoided. This advantage translates to lower investment costs and lower energy consumption per pound of product during preparation of the compounded product. In the exemplary embodiment where polyamide PA66 is compounded to provide a product comprising 35% fiberglass, the extruder motor size reduction is approximately 62%. In an exemplary embodiment, the molten polyamide feed stream is introduced directly from a continuous or batch polymerization process to a first portion of a twin-screw extruder with no solidification processing steps prior to introduction to the extruder. By introducing a molten feed to the extruder, the energy consumption of the extruder is reduced relative to an extruder receiving and compounding a solid feedstock. In a particular embodiment, it has been determined that for production of 33% fiberglass-filled nylon, the extruder required a specific energy of 0.071 kw-hr/kg with a molten feedstock, compared to the significantly higher 0.21 kw-hr/kg with conventional pelletized feedstock. This significant difference in energy can be largely attributed to the energy required to initially melt the incoming solid nylon feedstock. Additional savings occur with molten feedstock directly introduced to the extruder since the cumulative costs to pelletize, package, store and handle the feedstock are not incurred. Generally, between about 5 and about 10 cents per pound are saved by implementation of the present invention that consists of a reduced number of steps compared to conventional technologies. Lower feedstock working volumes and lower labor requirements are also included in these savings. In the exemplary embodiment where polyamide PA66 is compounded to provide a product comprising 50% fiberglass, the extruder motor size reduction is approximately 35%. FIG. 4 shows exemplary energy comparisons between a melt fed process and a conventional pellet fed process for preparing a compounded PA66 product with different glass content levels.

Since the step of melting the solid feedstock provided to the polymer compounding equipment is no longer necessary in view of the feedstock arriving from the continuous or batch polymerization process in a molten state, the performance of the polymer compounding equipment is enhanced for mixing additives, fillers, reinforcing agents and modifiers, resulting in more flexibility in, for example, the screw of an extruder. For the same cost investment of a typical pellet fed compounding extruder, the molten fed extruder of the present invention is able to achieve greater flexibility in producing higher volumes of different products due to the increased number of barrels available for additive feed and mixing. As a result, compounded products can be prepared in greater amounts and diversity using the molten fed compounding equipment of the present invention.

While a particular embodiment of this invention is demonstrated using nylon66, other nylons, other polyamides (such as poly(aminoundecanoamide), poly(aminododecanoamide), polyhexamethylene sebacamide, poly(p-xylyleneazeleamide), poly(m-xylylene adipamide), and polyamides from bis(p-aminocyclohexyl)methane and azelaic, sebacic and homologous aliphatic dicarboxylic acids) and the like are also envisioned to benefit from the process of the present invention. Copolymers of polyamides are also suitable for the process of the present invention. See, e.g., U.S. Pat. Nos. 3,236,914; 3,472,916; 3,373,223; 3,984,497; and 3,546,319.

An exemplary embodiment of the present invention comprises an extruder, a molten polyamide feed stream, where the molten feed stream is fed from a continuous polymerization process to an extruder, one or more additive feeds, in a section of the extruder downstream of the melt inlet, one or more vent ports for removal of moisture or impurities, and vacuum equipment for providing vacuum. In an exemplary embodiment, degassing in the course of compounding is facilitated by use of an entraining agent, such as, for example, nitrogen, argon or carbon dioxide. In an exemplary embodiment, the extruder comprises at least two degassing (vacuum) zones (i.e., at least two vent ports or inlets), at least one mixing zone (such as two, three, four or more), one or more metering zones and optionally a melting zone.

In a particular embodiment during compounding, the vacuum system is a liquid ring vacuum pump which may be used with or without partial seal fluid recycle. Optionally, depending on the level of the vacuum required, a booster compressor may be included in the vacuum skid system. In an exemplary embodiment, a reversing small vent extruder is included for preventing solids from accumulating in the vent area. The vent extruders (also referred to as vent stuffers) allow the vacuum vapors to flow to the downstream vacuum equipment while forcing any condensed material back into the extruder and at a sufficiently rapid rate that the material does not undergo significant degradation or discoloring due to lengthy exposure to high temperatures.

As defined herein, an extruder includes, but is not limited to, a single- or twin- or multi-shaft screw extruder, such as a twin-shaft screw extruder. In an exemplary embodiment, the extruder is a twin-shaft screw extruder. In another exemplary embodiment, the extruder is a twin-shaft screw extruder with co-rotation of the shafts. In an exemplary embodiment, the extruder is vented. In an exemplary embodiment, the extruder has a length to diameter ratio of the screw shaft in the range of 30:1 to 50:1, such as 32:1, such as 34:1, such as 36:1, such as 38:1, such as 40:1, such as 42:1, such as 44:1, such as 46:1, such as 48:1 and in all combinations of ranges, such as 32:1 to 50:1 or 32:1 to 34:1 or 42:1 to 46:1, etc. In a particular embodiment, the extruder is a Werner & Pfleider Co-rotating Twin Screw Extruder Model ZSK40. The length to diameter ratio of 44:1 is effective in this application. An 11-barrel extruder with a 40 mm diameter represents a particular embodiment for production of a glass-filled product with a PA66 molten feed.

In an exemplary embodiment, polymer filtration of the molten feedstock is accomplished using filters (such as mesh or fleece filters) in the range of about 5 microns to about 120 microns, such as between about 7 microns to about 100 microns, such as about 20 microns to about 50 microns.

The materials to be mixed/blended with the polymer include, but are not limited to, glass fibers (e.g., fiberglass, such as in chopped or roving form), waxes, minerals, carbon fibers, aramide fibers, fiber reinforcement, chain terminators, viscosity modifiers, plasticizers, heat stabilizers, UV stabilizers, colorants, catalysts, other polymers and impact modifiers, flame retardants, delusterants, fillers, antimicrobial agents, antistatic agents, optical brighteners, extenders, processing aids, talc, mica, gypsum, wollastonite and other commonly used additives known to those of skill in the art. Preferably, additives are hydrolysis resistant chopped glass, copper heat stabilizers, nucleating agents, Nigrosine and carbon black. Additional suitable additives may be found in *Plastics Additives, An A-Z reference*, Edited by Geoffrey Pritchard (1998). The optional addition of a stabilizer to the additive dispersion is present in an exemplary embodiment at between about 0.75% and about 7.5% by total dispersion weight. Stabilizers suitable for the additive dispersion include, but are not limited to, polyethoxylates (such as the polyethoxylated alkyl phenol Triton X-100), polypropoxylates, block copolymeric polyethers, long chain alcohols, polyalcohols, alkyl-sulfates, alkyl-sulfonates, alkyl-benzenesulfonates, alkyl-phosphates, alkyl-phosphonates, alkyl-naphthalene sulfonates, carboxylic acids and perfluoronates.

Suitable vacuum equipment includes, but is not limited to, liquid ring vacuum pumps, dry vacuum pumps and vacuum jets. Liquid ring vacuum pumps are preferred. For sufficiently low vacuum to achieve adequate impurity removal and consequently adequate plate-out molding performance, it is desirable to be below about 1013 mbar absolute, such as below about 500 mbar, such as below about 300 mbar, such as below about 150 mbar, such as below about 65 mbar, with a low end value of about 20 mbar. Depending on the system leaks and vacuum load, the liquid ring vacuum pump system can be supplemented by the dry vacuum booster compressor. In an exemplary embodiment, the booster compressor is not required in normal glass compounding extrusion with nylon PA66.

In an exemplary embodiment, the molten polyamide feed stream is introduced directly from a continuous or batch polymerization process to a first portion of a twin-screw extruder with no solidification processing steps prior to introduction to the extruder. By introducing a molten feed to the extruder, the energy consumption of the extruder is reduced relative to an extruder receiving and compounding a solid feedstock.

In an exemplary embodiment, the benefits of low mold plate-out of the product was achieved by extended vacuum time via increased exposure of the molten feedstock to the vacuum zones of the polymer compounding equipment, resulting in a greater degree of impurity removal and moisture removal. By using a molten polymer feed stream (such as a molten polyamide feed stream) rather than the polymer in solid form, a greater portion of the extruder length or space can be utilized for application of vacuum conditions rather than for melting the solid feedstock. The molten feedstock stream directly fed from a continuous or batch polymerization process also imparts a lower moisture load on the vacuum systems, thereby further increasing the ability of the vacuum systems to efficiently remove moisture and impurities from the product.

In an exemplary embodiment, the lowest capital and operating costs for compounded product are achieved by the elimination of the pelletization, storage, and transportation of polymer feed resin combined with a smaller compounding motor due to the unnecessary step of pelletizing and melting the feed resin. Also, costs are reduced with no required pellet feed storage, raw material handling labor, metering equipment, and no high cost working volume of resin. With less equipment, total operations and maintenance labor are minimized. Fewer spare parts are needed and reliability is higher with the reduced equipment count. Typically, pelletizing units require considerable maintenance upkeep, spare parts, offline calibration, and high repair costs. Also, with the directly coupled molten operation of the compounding operation, fewer lab samples are required to maintain excellent process and product quality control. Another reduction in cost is realized with the lower energy consumption of the compounding operation associated with no melting of the feed resin pellets. Combining the capital and operating cost advantages with the quality improvements such as lower variability, lower volatile content, better plate-out performance, provides for a highly advantaged business structure.

Examples of applications which would benefit from the in-line process improvements described herein would include articles prepared by injection molding processes, profile extrusion processes, sheet extrusion processes, and other forming processes known to those skilled in the art. These articles may be used in electrical and electronic applications (such as, but not limited to, circuit breakers, terminal blocks, connectors and the like), automotive applications (such as, but not limited to, air handling systems, radiator end tanks, fans, shrouds, and the like) and furniture and appliance parts.

Example 1: Method for Injection Molding Resins for Evaluating Plate-Out Performance This method determines the amount of plate-out residue in injection molding resins. Plate-out is generated by monomer, lubes, and additives that bloom to the surface during injection molding process. There is a customer expectation of a production length that is linked to product quality of plate-out.

Procedure
1. Install the plate-out tool into the injection molding machine. The mold used in this testing was built according to ISO 294 with the following deviations, mold vents are altered to a land of 0.0005 inches in depth and 0.125 inches in length this is then relieved to 0.005 inches deep and 1.0" in long inches.
2. Completely clean the entire molding surface using a paper towel and methanol.
    a. Mold surface is clean when there is no residue remains on the surface.
3. Mold 600 shots according to ISO 294, except for deviations in injection rate of 50 mm/s and mold temperature to 30° C., the purpose of these changes is to accelerate the build-up of plate-out deposits.

Example 2: Method for Measuring Mold Deposits (Plate Out) Collected on Polypropylene Wipes A pre-cleaned non-woven polypropylene wipe is used to collect plate out deposits left on surfaces of an injection mold after a known number of injection cycles. The deposits are removed from the wipe with hot methanol under controlled conditions, dried and weighed. The deposits weight is reduced by the weight of background extractables obtained from a clean wipe. This corrected weight is normalized to 1000 shots and reported as milligrams of extractable plate-out per 1000 shots.

I. Preparation of clean wipes
   a. Cut non-woven polypropylene cloth sheets into 3×3 inch squares using a sharp scissors to avoid frayed edges.
   b. Place about 20 of the 3×3 inch wipes into a 500 mL Erlenmeyer flask with a ground glass stopper and add 200 mL of methanol.
   c. Put flask in a large crystallizing dish containing about 2 inches of near-boiling water; place flask and dish on a hot plate set to low heat and allow methanol to reflux gently for 30 minutes.
   d. Pour off the methanol, replace with fresh methanol and heat for another 30 minutes
   e. Pour off the methanol; using metal forceps, place wipes in a clean crystallizing dish in a fume hood until wipes appear dry.
   f. Remove last traces of methanol by drying in oven at 90° C. for 30 minutes.
   g. Place each wipe inside a folded piece of aluminum foil which has been cleaned on both sides with acetone.
   h. Place foil-wrapped wipe in a plastic press-locked bag and label with date cleaned and mg of background extractables for that batch, as determined below.

II. Measurement of background extractables from clean wipes (includes any solvent residue contribution)
   a. Record all weights to 0.00000 grams (0.00 mg).
   b. Clean an aluminum dish with acetone and methanol rinses inside and out, dry in a 90° C. oven, cool and weigh.
   c. Rinse an acid digestion vial with methanol and use metal forceps to place a clean wipe into it.
   d. Add about 7 mL of methanol, cap the vial and shake or vortex mix for 15 seconds.
   e. Place vial in an aluminum heater block set to 80° C. for 30 minutes.
   f. Using leather gloves or other heat resistant gloves, remove vial from heater block and shake or vortex 15 seconds.
   g. Cool vial in running tap water for about 1 minute to bring methanol temperature below boiling point.
   h. Open vial and decant methanol into the weighed aluminum dish from step IIb.
   i. Add about 3 mL methanol to vial, cap and shake 15 seconds, decant into aluminum dish
   j. Put aluminum dish on hot plate with surface temperature 90-110° C. and evaporate methanol, removing dish as soon as dry.
   k. Repeat steps IId-IIj.
   l. Place dish in air oven at ~90° C. for 5 minutes.
   m. Remove from oven, cool 5 minutes in desiccator and weigh.
   n. Repeat steps III and IIm. If the weights differ by more than 0.00005 g, let the dish sit on a grounded metal surface for five minutes to discharge static and re-weigh.
   o. Calculate background extractables as: average of dried dish weights from step IIn-clean dish weight from step IIb.
   p. Check extractables for at least two wipes out of every 40 prepared and use the average extractables for the two wipes as the background extractables level for that batch.
   q. Typical background extractables level is approximately 0.5 mg/wipe or less. If background is higher, repeat the cleaning process and re-measure background.

III. Measuring extractable deposits on a used wipe
   a. After wiping out the mold, a wipe is put back into the foil wrap and plastic bag and labeled with the number of injection molding cycles ("shots") performed.
   b. Perform steps IIa-IIn on the used wipe.
   c. Calculate net extractables as the average extractables weight for the used wipe minus the background extractables weight for that batch of wipes.
   d. Using the number of molding "shots" noted in IIIa, normalize the net extractables to 1000 shots and report the result to one decimal place as: "extractable plate out=x.x mg/1000 shots".

IV. Chemicals and consumable materials
   a. Non-woven polypropylene fiber cleaning cloths, Berkshire Pro-Wipe® 880 or equivalent 12"×12".
   b. Methanol, Fisher Scientific HPLC grade or equivalent, with evaporation residue 0.5 ppm or less.
   c. Acid digestion vial, borosilicate glass with inert lined screw-on phenolic cap; vial dimensions approximately 19 cm long×1.6 cm diameter, 12 mL volume.
   d. Aluminum weighing dishes, approximately 70 mm wide by 15 mm tall, weighing about 2 grams; VWR Scientific catalog number 25433-085 or equivalent.

Table 1 shows the impact of increasing melt exposure and vacuum on the molding performance plate-out of a compounded nylon resin. It is clear from the results that superior performance is achieved with the present invention compared to conventional methods. Melt vacuum exposure time was determined according to the calculations below:

Variables:
N=number of screws
ID=inner diameter of screws (mm)
OD=outer diameter of screws (mm)
F=% fill in the vacuum section
L=length under vacuum (mm)
R=flow rate through extruder (kg/hr)
D=density of compound (g/cm$^3$)
Vf=volumetric flow rate=(R*1000)/(D*3600)
C=total cross sectional area=N*PI*(OD/2)^2−PI*(ID/2)^2
Cp=total cross sectional area filled with polymer given=C*F
Vv=total volume in vacuum section=Cp*L/1000
Vacuum Exposure Time=Vv/Vf (seconds)

The following constants were used for these calculations:
screws: 2
ID: 70 mm
OD: 96 mm
Density: 1.6 g/cm$^3$
% Fill (F): 25%
Length under vacuum (L): 768 mm Additional information relating to the devolatilization performance of a twin screw extruder can be found, for example, in *Polymer Extrusion*, (2001) 4th Edition, by Chris Rauwendaal, pp. 618-622. The high surface renewal and thin film generation in the extruder enhances devolatilization effectively with low overall residence time.

TABLE 1

| Operating Conditions | | | | |
|---|---|---|---|---|
| Compounding | | Vacuum | Molding Performance | |
| Rate (lbs/hr) | Vacuum (in Hg) | Exposure Time (s) | Shots Until Burning | Plate Out (mg/100 shots) |
| Conventional Process | | | | |
| 2500 | 25 | 1.52 | >600 shots | 1.8 |
| 3000 | 25 | 1.36 | 341 | 2.8 |
| 3500 | 25 | 1.21 | 318 | 2.7 |
| 3700 (high plateout conditions) | 20 | 1.14 | 88 | 5.8 |
| Improved ILC Process | | | | |
| 6000 | 28 | 2.75 | >600 shots | 0.77 |
| 6000 | 28 | 2.75 | >600 shots | 0.62 |

Reviewing the results of Table 1, it is apparent that the present invention results in significantly improved molding performance compared to the conditions in which the nylon feedstock is introduced in a pelletized (i.e., solid) form (conventional process). For example, a solid feedstock exposed to the least amount of vacuum time exhibited the lowest number of shots until burning (88) and the highest plate-out value (5.8), In contrast, the molding performance of the molten nylon feedstock (ILC process) showed no burning in the mold and, more significantly, the least amount of plate-out (0.7 or less) compared to all tests using solid feedstock. For the customer, these improvements translate into extended up-time on equipment since there are fewer overhauls of the molds, allowing the equipment to produce more parts with the same capital cost and lower operating costs. Product quality also is improved with less plate-out as the deposits can contaminate the product and impart surface defects on the produced molded parts. In customer molding applications exhibiting complicated or intricate mold venting manifolds, this benefit has even more impact in improving product quality and process output or yield. Cost savings and earnings for these plants could be increased as much as 50% or more given the potential for lower plate-out. In a particular embodiment, a customer typically operates Monday through Friday producing injection molded parts by conventional means with a compounded product feedstock. Then they schedule a necessary cleaning of the molding equipment over the two-day weekend. Employing the low plate-out compounded product of the present invention as the feedstock, this molding customer can operate continuously for at least two weeks before needing to shut down to clean the their equipment, thus allowing for the significant increase in productivity of 2 days out of 14 days, an increase of about 15%.

In Table 2, comparisons are made with conventionally prepared products (standard pellet fed configuration) and a product prepared from the ILC process of the invention. Clearly, the plate-out results indicate that an inline molten feed produces a material substantially superior to that obtained from standard pellet fed operations. Unlike the products prepared from the pellet fed operations, the ILC product has substantially lower plate-out performance which would be realized as increased uptime and productivity for customers using this material.

TABLE 2

| Source | Glass % FG | Plate-out mg/1000 Shots |
|---|---|---|
| Pellet-fed-High Plate-out Conditions | 33 | 10.50 |
| Pellet-fed-Low Plate-out Conditions | 33 | 3.50 |
| Competitor A nylon product | 33 | 3.50 |
| Competitor B nylon product | 33 | 5.80 |
| Continuous Polymerization (ILC) Molten Fed Commercial Line | 33 | 2.00 |
| Pellet-fed Normal Conditions | 50 | 2.80 |
| Competitor A nylon product | 50 | 3.80 |
| Continuous Polymerization (ILC) side stream Molten fed Pilot Line | 50 | 0.90 |
| Continuous Polymerization (ILC) Molten Fed Commercial Line | 50 | 0.90 |

In Table 2, "ILC" refers to inline compounding. Competitor A and B products refer to commercial nylon products and are tested to illustrate the superior performance achieved using the ILC process of the invention with regards to plate-out.

Figure 5:
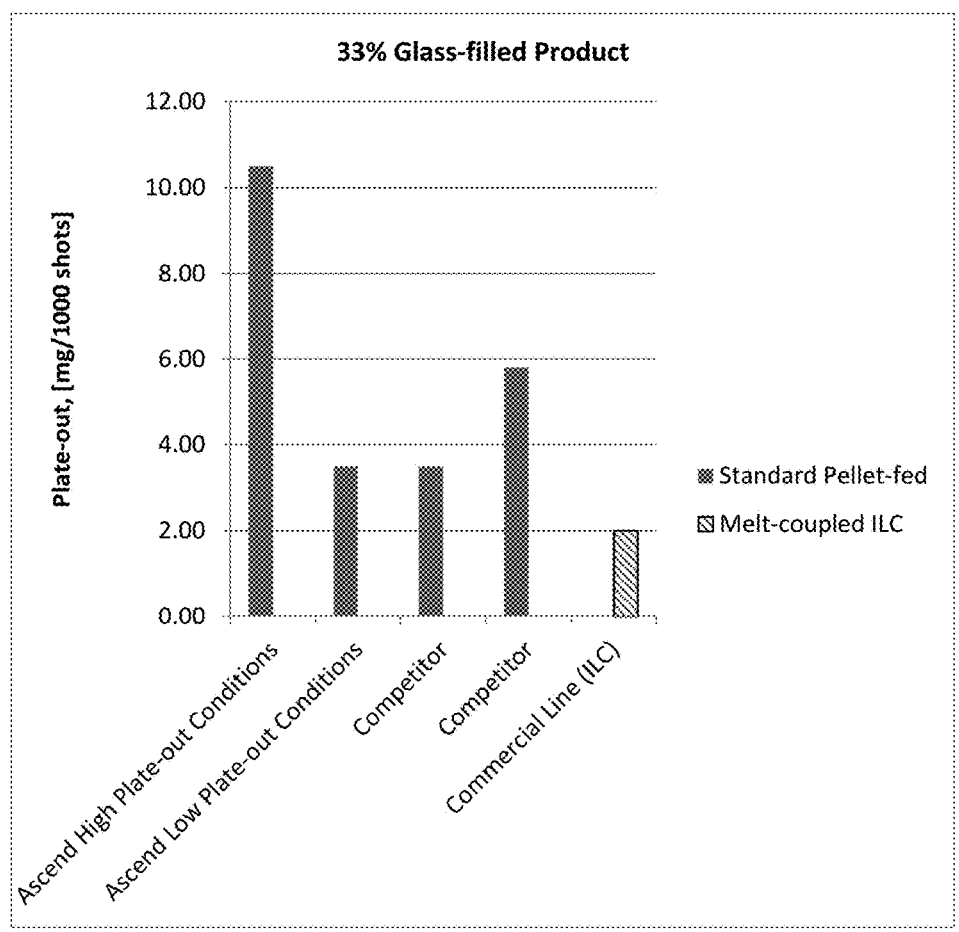
FIG. 5 represents the data from Table 2 in bar graph format in comparing a conventionally prepared 33% glass-filled product using standard pellet fed configurations to a 33% glass-filled product prepared from the ILC process of the invention.
Figure 6:
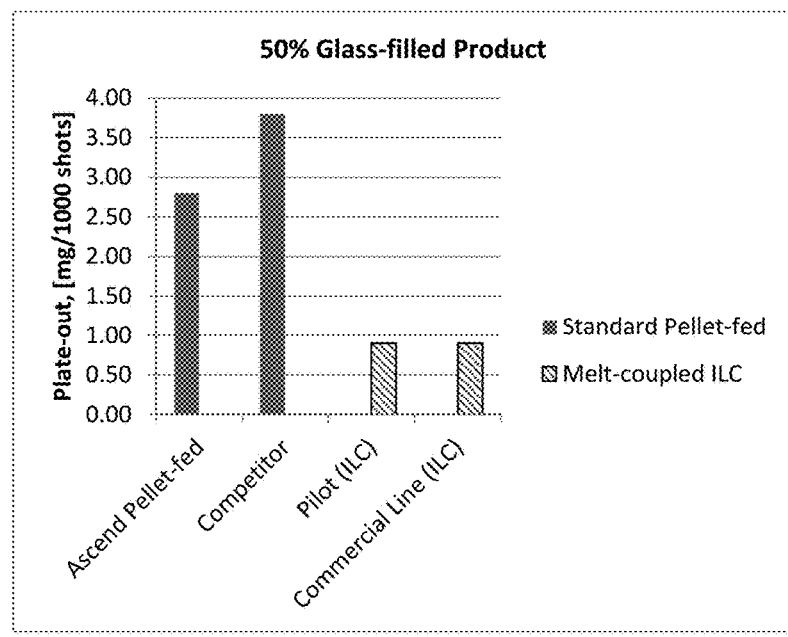
FIG. 6 represents the data from Table 2 in bar graph format in comparing a conventionally prepared 50% glass-filled product using standard pellet fed configurations to a 50% glass-filled product prepared from the ILC process of the invention.

FIG. 5 and FIG. 6 represent the data from Table 2 in bar graph format. FIG. 6 clearly illustrates the significant plate-out (amount of mold vent deposits) associated with the direct molten fed compounded lines (ILC) in both the pilot unit rated at 400 pounds per hour of a 50% glass product and the commercial-sized ILC line capable of more than 6,000 pounds per hour of a 50% glass product.

As described herein, a continuous feed from a continuous polymerization process provides a more stable feedstock for compounding. This low variability translates into lower variability in the compounded product.

In an exemplary embodiment of the invention, a polyamide prepared by the process described herein has a plate-out value of less than about 2 mg/1000 shots, such as less than about 1.5 mg/1000 shots, such as less than about 1.0, such as less than about 0.5 mg/1000 shots, wherein 0.1 mg/1000 shots is considered as the minimum value.

Table 3 compares viscosity standard deviation for a typical pellet fed compounding product and a product of the present process produced in a 150-kilogram per hour pilot operation. Unlike conventional pellet-fed compounding lines, the inline molten-coupled compounding line exhibits the low variability within the continuous polymerization line, free of the variability arising from multiple resin sources, multiple moisture levels in the resin, and multiple ages of the resin feedstock. This consistent feed leads to lower variability as demonstrated with the pilot line results below. The molten-coupled compounding is uniquely enabled to provide the least variable product of any compounding operation tested.

TABLE 3

| | Conventional Pellet-Fed Compounding | Molten-Fed Compounding (ILC) | % Reduction |
|---|---|---|---|
| Standard Deviation of Relative Viscosity | 1.9 | 0.9 | 53% |

As a result of the reduced compounded product variability, the customer in a molding operation is expected to have better shot to shot consistency, leading to greater dimensional and weight stability, less warpage, and lower scrap rates, i.e., higher yield. On any given run, parts produced on an injection molding process will have a distribution of dimensions, in which the variation can be caused by viscosity variations with the compounded material. Variation can also be caused by other factors (ambient conditions, machine wear, etc.). On any given run, parts produced on an injection molding process will have a distribution of masses, in which the variation can be caused by viscosity variations with the compounded material. Variation can also be caused by other factors (ambient conditions, machine wear, etc.).

Additionally, the lower variability is expected to result in more consistent pressures and feeding rates in the customers' molding processes, which lead to lower scrap rates, i.e., higher yields, and faster cycle times resulting in higher production rate or throughput. As a result, the customer is able to produce more products with lower investment. Also, the products are expected to exhibit improved product color, typically visualized as being less yellow. The products also are expected to have higher tensile strength because of the lower heat history (factors of, for example, temperature and residence time) resulting from the faster cycle times attributable to lower feed variability and no melting step between the continuous polymerization and compounding processes.

All published documents (e.g. patents, journal articles, books) cited herein are incorporated by reference in their entireties. Embodiments of the present disclosure employ, unless otherwise indicated, chemical and engineering techniques which are within the skill of the art. Such techniques are fully explained in the literature. As would be apparent to those of skill in the art, several of the embodiments described herein have components and features that may be readily separated from or combined with the features of other embodiments without departing from the scope or spirit of the present disclosure.

What is claimed is:

1. A compounded nylon prepared by
   introducing a nylon feedstock to one or more extruders at a consistent rate, the extruder containing at least 2 vent ports, where at least one of the at least 2 vent ports is subjected to vacuum conditions and where all vacuum conditions in the extruder are applied consistently, followed by
   mixing and/or blending the nylon feedstock with one or more materials to provide the compounded nylon,
   wherein the feedstock is prepared in a molten form by a batch polymerization process or a continuous polymerization process and delivered directly in molten form to the one or more extruders,
   wherein the compounded nylon has a plate-out value of less than about 2.0 mg/1,000 shots and a relative viscosity (RV) range between samples of less than about 2 units.

2. The compounded nylon according to claim 1 exhibiting greater than about 500 shots before detection of burn material in a mold for mold injection.

3. The compounded nylon according to claim 1, wherein the extruder is a twin-screw extruder.

4. The compounded nylon according to claim 3, wherein the twin-screw extruder contains at least 3 vent ports.

5. The compounded nylon according to claim 4, wherein the vent ports are subjected to vacuum conditions.

6. The compounded nylon according to claim 3, wherein the twin-screw extruder has a length to diameter ratio of the screw shaft in the range of 24:1 to 56:1.

7. The compounded nylon according to claim 1, wherein only a portion of the molten feedstock is sent directly to the one or more extruders.

8. The compounded nylon according to claim 1, wherein the materials comprise one or more fibers, waxes, minerals, chain terminators, viscosity modifiers, plasticizers, heat stabilizers, UV stabilizers, colorants, catalysts, flame retardants, delusterants, fillers, reinforcing agents, antimicrobial agents, antistatic agents, optical brighteners, extenders and processing aids.

9. A compounded nylon prepared from molten nylon feedstock introduced to a twin-screw extruder at a consistent rate and mixed and/or blended with one or more materials to provide the compounded nylon, the extruder containing at least 3 vent ports and having a length to diameter ratio of the screw shaft in a range of 24:1 to 56:1, where two of the at least 3 vent ports are subjected to vacuum conditions of less than 500 mbar and where all vacuum conditions in the extruder are applied consistently, the compounded nylon having a relative viscosity in a range between about 40 to about 100 and a plate-out value of less than about 2.0 mg/1,000 shots.

10. The compounded nylon according to claim 9, wherein the relative viscosity is in a range between about 40 to about 80.

11. The compounded nylon according to claim 9, wherein the plate-out value is less than about 1.0 mg/1,000 shots.

12. The compounded nylon according to claim 9, wherein the materials comprise one or more fibers, waxes, minerals, chain terminators, viscosity modifiers, plasticizers, heat stabilizers, UV stabilizers, colorants, catalysts, flame retardants, delusterants, fillers, reinforcing agents, antimicrobial agents, antistatic agents, optical brighteners, extenders and processing aids.

13. A plurality of compounded nylon samples prepared from molten nylon feedstock introduced directly to an extruder at a consistent rate and mixed and/or blended with one or more materials, the extruder containing at least 2 vent ports, where at least one of the at least 2 vent ports is subjected to vacuum conditions and where all vacuum conditions in the extruder are applied consistently, the plurality of nylon samples having a relative viscosity range between the samples of less than about 3 units.

14. The plurality of compounded nylon samples according to claim 13, having a relative viscosity range between the samples of less than about 2 units.

15. The compounded nylon according to claim 1, wherein fiberglass is the material compounded with the nylon in a range of about 5% to about 60% by weight.

16. The compounded nylon according to claim 9, wherein the nylon is compounded with fiberglass.

* * * * *